United States Patent [19]

Nemesnyik

[11] Patent Number: 4,537,500

[45] Date of Patent: Aug. 27, 1985

[54] PHOTOGRAPHIC CONTRAST CONTROL DEVICE

[75] Inventor: John C. Nemesnyik, Nutley, N.J.

[73] Assignee: Charles Beseler Company, Florham Park, N.J.

[21] Appl. No.: 571,996

[22] Filed: Jan. 19, 1984

[51] Int. Cl.³ ............................................. G03B 27/54
[52] U.S. Cl. ......................................... 355/67; 355/1; 354/202
[58] Field of Search ................................ 355/1, 67, 66; 354/202 FF

[56] References Cited

U.S. PATENT DOCUMENTS

| | | | |
|---|---|---|---|
| 2,135,575 | 11/1938 | Hansch et al. | 354/202 FF |
| 2,556,307 | 6/1951 | Walker | 354/202 FF |
| 3,575,510 | 4/1971 | Kohashi | 354/202 FF |
| 3,854,815 | 12/1974 | McIntosh | 355/67 |
| 4,021,831 | 5/1977 | Bercher | 354/202 FF |
| 4,172,640 | 10/1979 | Land | 354/202 FF |

*Primary Examiner*—Monroe H. Hayes
*Attorney, Agent, or Firm*—Darby & Darby

[57] ABSTRACT

A contrast control device fogs a photographic recording medium with diffuse light simultaneously with the imaging of that medium. The diffuse light is colinear with the imaging light. The contrast control includes a semi-transparent mirror arranged diagonally across the light path. A fiber optic cable collects diffuse light and delivers it at a right angle to the cone of imaging light. This diffuse light also passes through the partial mirror and is received by a reflector. The reflector converts the diffuse light into a diffuse cone of light which approximates the imaging cone of light. This second or diffuse cone of light is reflected onto the partial mirror which in turn, reflects it onto the photographic medium substantially colinear with the imaging cone of light.

17 Claims, 4 Drawing Figures

PHOTOGRAPHIC CONTRAST CONTROL DEVICE

BACKGROUND OF THE INVENTION

The present invention relates to the production of photographs and, more particularly, to the control of the contrast in those photographs.

In the course of producing photographs directly with a camera, through slide duplication or through enlargement, there can be problems with contrast. Typically, the contrast increases during normal printing and duplicating processes. This problem is particularly significant when making prints or duplicates of 35 mm slide transparencies, but is also present in other photographic processes.

A well known method of reducing contrast is through controlled fogging of the film, i.e. exposure of the film to controlled and small amounts of diffuse light. This may be done before, during or after the imaging exposure of the film.

One means of automatically fogging film is shown in FIGS. 1 and 2 of U.S. Pat. No. 4,021,831 of Bercher. In this device, light from an object is collected by a lens and focused on film. Located between the lens and the film is a light conductor which directs light from a local source obliquely onto the film.

A disadvantage of this arrangement is that the distribution of the fogging light from the fiber optic cable cannot be well controlled at different magnifications. Therefore the contrast reduction will vary from place to place on the film. A second disadvantage is that the camera must be modified to accept the fiber optic cable. Consequently, the user is not free to use any camera he chooses.

An alternative way of controlling contrast is illustrated in FIG. 3 of the Bercher patent. In this arrangement a semi-transparent mirror is interposed at a 45° angle between the lens and the film. The light image passes through the mirror to the film, and diffuse light from a local source is directed at a right angle to the image light path on to the mirror. The mirror reflects it in line with the image light and onto the film.

Even though the imaging light and the fogging light are in the same general direction in this arrangement, they are not colinear. The fogging light is spread out over a much wider area and is difficult to control at different magnifications.

Both of the arrangements in the Bercher patent require a second local light source in the diffusion control device. This not only increases the complexity and cost of the system, it requires a means for synchronizing the turning on and off of the two light sources. Further, any changes in the intensity or color of the primary light source due to lamp aging or the use of color filters must be compensated manually at the contrast control lamp by adjusting the intensity and using matching color filters. Also both methods require modification to the camera.

A further device is shown in FIG. 4 of the Bercher patent. It uses the light which creates the image to produce the fogging light and is also positioned outside the camera so the camera need not be modified. However, like the other devices its fogging light is not in the form of a cone of light approximating the cone of imaging light. Thus the contrast is not well controlled over the entire negative in any of these prior devices.

SUMMARY OF THE INVENTION

The present invention is directed to overcoming the problem of contrast control in photographic duplication by causing fogging of the film simultaneously with imaging of it through the use of colinear diffuse light.

In an illustrative embodiment of the invention, a photographic contrast control device is used in conjunction with a conventional image forming device, such as a camera or enlarger. The conventional device is used to form a light image which travels in the form of a cone of light along a path through a lens to the film. Located in the path of this light is a partial or semi-transparent mirror which is positionad diagonally across the path of the cone of light travelling to the lens. However, because of the property of this mirror, the imaging light easily passes through the mirror and the lens to the film. A light source, preferably a fiber optic cable, takes a portion of the light from the imaging device and directs it at the partial mirror at a right angle to the path of the cone of imaging light. The light from the fiber optic cable passes through the semi-transparent mirror and contacts a spherical or aspherical reflector. The reflector converts this light into a cone of diffuse light approximating the cone of light forming the image. This cone of diffuse light is directed back onto the the semi-transparent mirror and is reflected into the lens and onto the film. By a proper spacial arrangement, the cone of diffuse light from the reflector is made to coincide nearly identically with the cone of light forming the image on the film.

Since the fogging light which controls the contrast is colinear with the imaging light cone, a very precise control over contrast is achieved over the entire film. This device is particularly useful in slide duplicators, but is also useful to control contrast in photographic enlargers, photographic cameras and other imaging devices.

BRIEF DESCRIPTION OF THE DRAWINGS

The foregoing and other features of the present invention will be readily apparent from the following detailed description and drawings of illustrative embodiments of the invention in which.

DESCRIPTION OF ILLUSTRATIVE EMBODIMENTS

Figure 1:
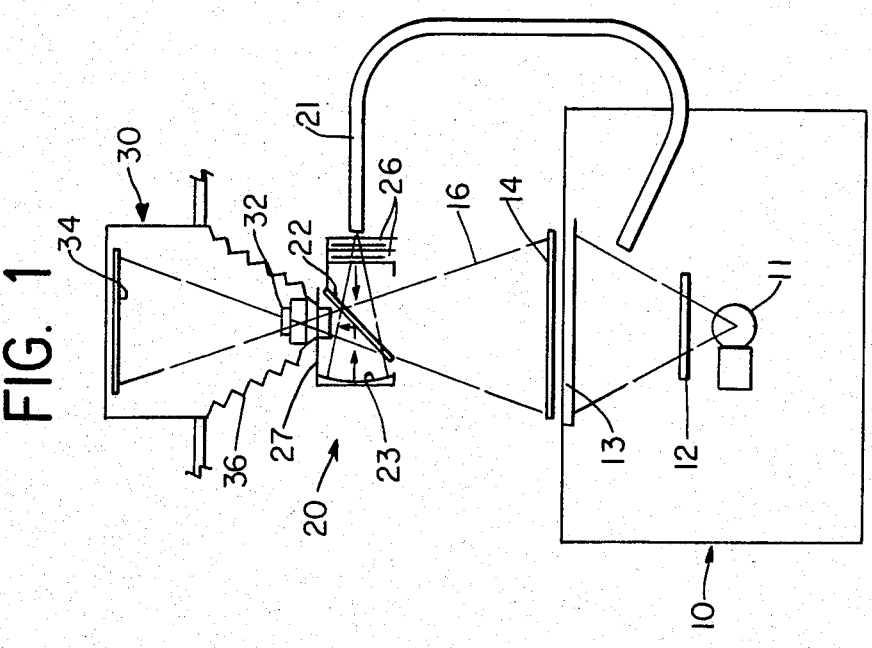
FIG. 1 is an illustrative embodiment of the present invention used in conjunction with a slide duplicator.

In FIG. 1 there is shown a slide duplicator. The duplicator basically comprises a cabinet or housing 10 which creates a cone of light 16 containing the image of the slide 14. This cone of light passes through a lens 32 into a camera 30 which contains film 34 upon which the duplicate slide is created.

In the cabinet 10, there is a lamp 11 which illuminates a diffuser screen 13 located near its upper surface. If desired, dichroic filters 12 can be inserted between the light source 11 and the diffuser 13. The slide 14, which is to be reproduced, is positioned on top of diffuser 13.

In order to reduce the contrast in the developed slide, a contrast control device 20, according to the present invention, is inserted in front of the lens 32 of camera 30. This control device is shown in more detail in FIG. 2.

The contrast control device has a housing 27 which supports a partial or semi-transparent mirror 22 positioned at an approximately 45° angle with the axis of the cone of imaging light 16. This mirror may in practice, be a sheet of glass. Regardless of its form, the mirror allows some transmission of light passing in the direction from the slide 14 to the lens 32. Also, light impinging on the side of the mirror closest to the lens is at least partially reflected.

Figure 2:
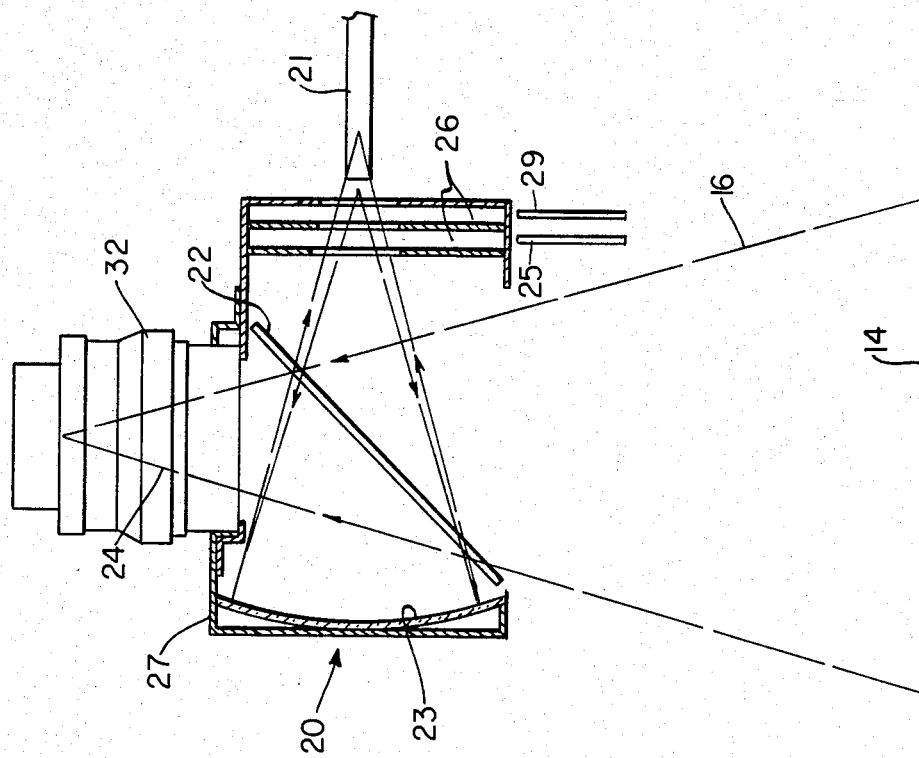
FIG. 2 is an enlargement of the contrast control device of FIG. 1.

As shown more clearly in FIG. 1, a light conductor 21, in the form of a fiber optic cable or light pipe, extends from the cabinet or housing 10 to a position adjacent mirror 22. This light conductor takes light from housing 10 and delivers it at a substantially right angle to the axis of the cone of light 16 as shown in FIG. 2. This light impinges on the mirror 22 on the same side as the cone of imaging light and a portion of it passes through the mirror and is received by spherical or aspherical reflector 23. The shape of the reflector and the positioning of the light conductor is such that reflector 23 converts the light from the light conductor into a cone of diffuse light approximating the cone of light 16 from the slide. This second or diffuse cone of light impinges upon the upper surface of mirror 22 and is reflected as cone 24 into the lens 32 of the camera portion of the duplicator.

In order to provide intensity control and color correction, light filters 25 and 29 may be inserted in slots 26 in the housing so as to be in the path of the diffuse light from light conductor 21. The filter that controls intensity may be in the form of a rotatable wheel with a plurality of holes through it which are equidistant from its center. In the holes their are mounted neutral density filters having different transmissivity. There may also be a position on the wheel which is completely opaque so as to block all diffuse light from conductor 21. By turning the wheel the intensity is controlled and the contrast control can even be turned completely off by rotating the opaque portion of the wheel in front of light conductor 21.

Again, referring to FIG. 1, the cone of combined light from the contrast control device and the imaging light from the slide, impinge upon film 34 in the camera. In order to eliminate stray light and to allow the accurate positioning of lens 32, a conventional bellows 36 connects the lens to the body of camera 30. In addition, a conventional shutter means is typically provided in the camera for controlling exposure of the film.

As an alternative to the collection of light from housing 10 and the transmission thereof through the fiber optic cable to the contrast control device, an independent light source may be connected to the fiber optic cable. However, this arrangement is not preferred since it requires adjustment of the intensity of the independent light source to correspond to any change in the output of lamp 11. However, since the shutter for the camera is located within camera 30 and the contrast control device is completely external thereto, there is no need to synchronize operation of a second light with lamp 11 because the shutter will take care of exposure control. Also, the fact that the contrast control device 20 is mounted externally of the camera 30 means that it can be attached to any convenient slide duplicating equipment.

Figure 3:
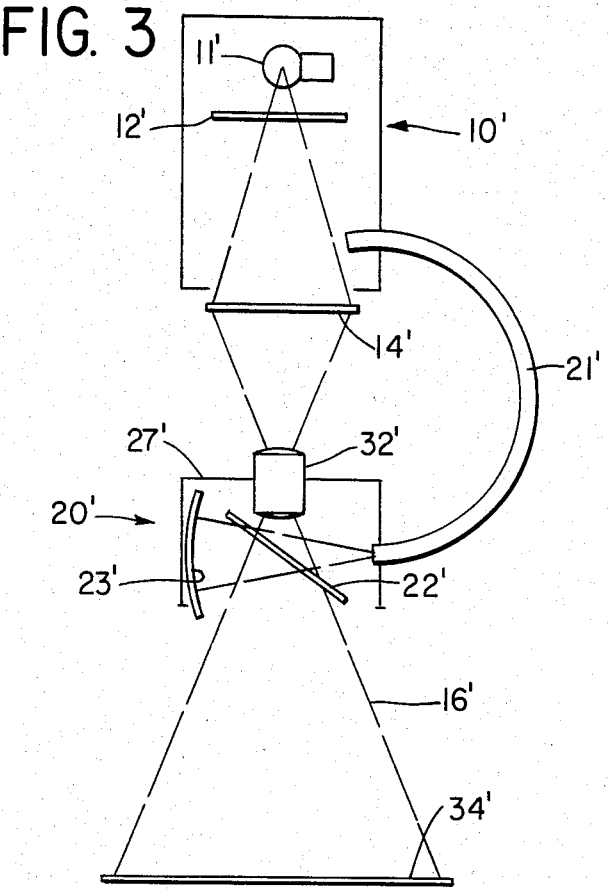
FIG. 3 is an illustrative embodiment of the invention used with a photographic enlarger.

In FIG. 3 there is a somewhat schematic illustration of a photo enlarger utilizing the present invention. Portions of this enlarger which correspond generally to portions of the slide duplicator of FIG. 1 have been marked with the same reference number and a prime. In particular, a light source 11' for the enlarger is contained within a housing 10'. This light passes through any desired dichroic filters 12' and impinges upon a photographic negative 14' to be enlarged. The light from this transparent negative is collected by the enlarger lens 32' and is imaged on a large sheet of print paper 34'. The contrast control device 20 of the present invention is again attached to the lens of the system such that partial or semi-transparent mirror 22' is diagonally arranged across the path of light from lens 32' to the print paper 34'. By means of fiber optic cable 21', light is taken from the enlarger light source housing 10' and is delivered at a right angle to the path of the imaging light adjacent the partial mirror 22'. This light passes through the mirror and is formed into a light cone by reflector 23'. Proper arrangement of these parts causes this cone of diffuse light to be colinear with the imaging light created by the slide 14'.

Figure 4:
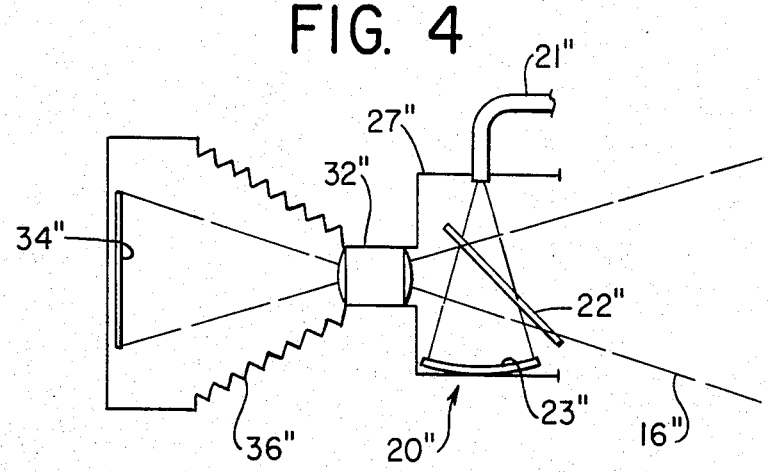
FIG. 4 is an illustrative embodiment of the present invention used in conjunction with a camera.

FIG. 4 shows an arrangement similar to FIGS. 1 and 3, but adapted for use of the contrast control device of the present invention with a conventional camera. This contrast control device is attached to the lens of a camera so as to position the partial mirror across the path of light from an image to be photographed to the camera's lens. Corresponding elements of this arrangement have been marked with the same reference numbers used in FIGS. 1 and 3, except that they have been identified with a double prime. Thus light from a fiber optic cable or rigid light pipe 21'' is directed at a right angle to the imaging light. The diffuse light from the fiber optic conductor passes through the partial mirror 22'' to spherical reflector 23''. As previously noted, this reflector converts the light into a cone which is approximately the same as that forming the image in the camera. The collected light from the image and the cone of diffuse light from the reflector 23'', which has been reflected from the back side of the partial mirror 22', both pass through the camera's lens 32'' and impinge on film 34'' in the camera.

In any of the arrangements disclosed, the exact position of the diffuse light can be varied by having the light source position adjustable relative to the imaging reflector. Also, intensity and color correction filters can be used on the diffuse light in any of these arrangements.

While the present invention has been particularly shown and described with reference to preferred embodiments thereof, it will be readily apparent to those skilled in the art that various changes in form and details may be made therein without departing from the spirit and scope of the invention. The present invention is thus limited only by the appended claims, and not by the foregoing description.

We claim:

1. A photographic contrast control device for use with apparatus having a light source that creates a cone of light forming an image, which light is directed along a path from the image source through a lens onto film while the film is simultaneously partially fogged by diffused light which is substantially colinear with the light from the image, comprising:

a partial mirror means positioned diagonally across the path of the cone of light travelling to the lens so that one side generally faces the image source and one side generally faces the lens, said partial mirror means being at least partially transmissive to light directed onto the side facing the image source and at least partially reflective to light directed onto the side facing the lens;

diffuse light means for directing diffuse light at substantially a right angle to the light path through said partial mirror means from the image source side of said partial mirror; and reflecting means for reflecting the diffuse light from said diffuse light means after it has passed through said partial mirror means and forming it into a cone of light approximating the cone of light from the image source, the cone of light from said reflecting means being directed onto said partial mirror means and being reflected thereby into the lens such that it is colinear with the cone of light from the image source.

2. A device as claimed in claim 1 wherein the apparatus with which it is used is a slide duplicator.

3. A device as claimed in claim 1 wherein the apparatus with which it is used is an enlarger.

4. A device as claimed in claim 1 wherein the apparatus with which it is used is a camera.

5. A device as claimed in claim 1 wherein the partial mirror is a piece of transparent glass.

6. A device as claimed in claim 1 wherein the reflecting means is a spherical reflector.

7. A device as claimed in claim 1 wherein the reflecting means is an aspherical reflector.

8. A device as claimed in claim 1 wherein the diffuse light means includes means for controlling the intensity of the light diffuse light.

9. A device as claimed in claim 8 wherein the means for controlling the intensity is a plurality of neutral density filters.

10. A device as claimed in claim 1 wherein the diffuse light means includes means for controlling the color of the diffuse light.

11. A device as claimed in claim 10 wherein the means for controlling the color is at least one color filter.

12. A device as claimed in claim 1 wherein the diffuse light means comprises a light conductor and a light source.

13. A device as claimed in claim 12 wherein the light conductor is a fiber optic cable extending from the vicinity of the image source to a position adjacent the partial mirror means, and the light source is the same light source used to create the image.

14. A device as claimed in claim 12 wherein the light conductor is a rigid light pipe extending from the vicinity of the light image source to a position adjacent the partial mirror means, and the light source is the same light source used to create the image.

15. A photographic slide duplicator with contrast control comprising:

a source of diffuse light located at one side of the slide so as to produce an imaging cone of light with the slide image;

a camera positioned to receive the imaging cone of light through a lens and being adapted to expose a film adapted for producing duplicate slides with said light; and a contrast control device positioned in the path of the imaging cone of light from the slide to the lens, said device including a partial mirror positioned diagonally across the path of the imaging cone of light and having a front side and a back side, the imaging cone of light being directed onto the back side of the mirror and a portion of it passing through the mirror to the lens, a light conductor delivering diffuse light in a channel from the source of diffuse light, the diffuse light being at a substantially right angle to the imaging cone of light and being directed against the back side of said mirror, at least a portion of the diffuse light passing through said mirror; and a reflector for receiving the diffuse light passing through the mirror, converting it into a diffuse cone of light approximating the imaging cone of light, and directing the diffuse cone of light onto the front side of said mirror, the front side of said mirror reflecting at least a portion of the diffuse cone of light onto the lens substantially colinearly with the imaging cone of light.

16. A photographic enlarger with contrast control comprising:

a source of diffuse light located at one side of a photographic transparency so as to produce an imaging cone of light with the transparency image;

an enlarging lens positioned to receive the cone of light and to direct it onto a piece of photograph print paper in the form of a further imaging cone of light; and a contrast control device positioned in the path of the further imaging cone of light from the lens to the print paper, said device including a partial mirror positioned diagonally across the path of the further imaging cone of light and having a front side and back side, the further imaging cone of light being directed onto the back side of the mirror and a portion of it passing through the mirror to the print paper, a light conductor delivering diffuse light in a channel from the source of diffuse light, the diffuse light being at a substantially right angle to the further imaging cone of light and being directed against the back side of said mirror, at least a portion of the diffuse light passing through said mirror, and a reflector for receiving the light passing through the mirror, converting it into a diffuse cone of light approximating the further imaging cone of light, and directing said diffuse cone of light onto the front side of said mirror, the front side of said mirror reflecting at least a portion of the diffuse cone of light onto the print paper substantially colinearly with the further imaging cone of light.

17. A photographic camera with contrast control comprising:

a housing for containing film;

a lens for forming a cone of light from an object into an image on the film; and a contrast control deviced portion in front of said lens, said device including a partial mirror positioned diagonally across the path of the cone of imaging light from the object to said lens and having a front side and a back side, the cone of imaging light being directed onto the back side of the mirror and a portion of it passing through the mirror to the lens, a light conductor delivering diffuse light in a channel at a substantially right angle to the cone of imaging light and against the back side of said mirror, at least a portion of the diffuse light passing through said mirror, and a reflector for receiving the light passing through the mirror, converting it into a diffuse cone of light approximating the imaging cone of light, and directing said diffuse cone of light onto the front side of said mirror, the front side of said mirror reflecting at least a portion of the diffuse cone of light onto the lens substantially colinearly with the imaging cone of light.

* * * * *